United States Patent Office 3,057,469
Patented Oct. 9, 1962

3,057,469
SILICONES
Herbert M. Bond, Maplewood, and Jun Tomita, St. Paul, Minn., assignors to Minnesota Mining and Manufacturing Company, St. Paul, Minn., a corporation of Delaware
No Drawing. Filed Nov. 24, 1958, Ser. No. 775,723
9 Claims. (Cl. 206—47)

This invention relates to siloxane structural castings, and more particularly to fluid pourable siloxane compositions adaptable for curing into flexible, resilient and tough structural products. This invention also provides conveniently handled package-articles of separated components for making our compositions, permitting easy handling of our compositions in commerce and in practical use applications.

The liquid compositions of this invention are particularly useful in encapsulating or potting applications where a protective heat- and cold-resistant, insulating structure is to be formed about or between elements in difficultly accessible locations where pasty or semi-solid materials cannot be handled conveniently. As an illustration, our compositions may be used to provide an insulating and protective layer about transformers in metal containers simply by pouring the liquid composition in the container about the transformer. The poured composition flows into all crevices and, in the preferred embodiment of the invention, cures up under room-temperature conditions. As it cures, it exhibits high tack and adhesive properties. Thus it forms a strong bond to the transformer as well as the metal container. The cured siloxane can withstand severe shocks even under extremes of temperatures, e.g., temperatures as low as —100° F. or lower, and as high as 500° F. or even higher, without shattering or crumbling. It is tough, resilient and essentially tack-free. Insofar as we are aware, no one heretofore has ever been able to prepare a fluid solvent-free pourable siloxane composition which on curing exhibits high tack properties and which after curing exhibits essentially no tack and possesses high strength, toughness, crumble-resistance, flexibility, and resilience.

Fluid, room-temperature curing siloxane compositions, however, have been known heretofore. For example, a known composition consists of a liquid diorganopolysiloxane gum, ethyl polysilicate, and a metal salt of a carboxylic acid. While this composition exhibits an ability to cure into a solid product under room temperature conditions, the end product is relatively weak in tensile strength, has little or no toughness, and is easily crumbled by merely rubbing a blunt instrument over its surfaces. Its texture may be referred to as cheesy, since it crumbles in much the same manner as dried cheese. A one-half inch thick cured layer of this prior art product is easily torn or split by simply using one's hands to pull it apart.

A one-half inch thick cured layer of the product of this invention, however, cannot be split or pulled apart using one's hands. It is extremely resistant to crumbling and is very tough. The toughness of our cured product is somewhat analogous to the toughness of cured products formed from the best high molecular weight siloxane gums filled with reinforcing fume silica. In addition, our cured product is flexible and resilient so that it can withstand severe vibrations under extremes of temperature without cracking. It also possesses good electrical insulation properties. All of these properties in combination render the fluid composition of this invention particularly useful for encapsulating or potting electrical or electronic assemblies designed for use in aircraft or missiles, as well as in various structural applications in the body of an aircraft or missile.

As may be seen by reviewing the illustrative examples of our invention, essential ingredients of our composition have all been well-known and available for several years. It was particularly surprising, therefore, to find that amongst these well-known ingredients is an unusual combination in a particular range of concentration relationships which gives an entirely new type of result. The result is in no way predictable from prior art, and even appears contrary to what one might expect. For example, we employ a fluid organopolysiloxane in our composition in rather large amount; and while such material may be cured, it is known to cure to a punky or cheesy state rather than a tough, resilient, strong structure. Silica fillers have been worked into organosilicon gums and are known to reinforce the same, yet we do not find the presence of silica fillers to be essential in achieving our tough structures. In fact, silica fillers when mixed with a fluid silicone gum in the large amounts sufficient to impart all necessary strength to a cured mixture of the gum, also tend to firm up ("crepe-harden") the composition before curing is accomplished; and one loses desired fluidity and pourability. In brief, we have been unable to find any fully satisfactory prior art theory to explain our unusual result.

Our compositions include a mixture of (1) between 60 and 80 parts by weight of a diorganopolysiloxane fluid gum having a viscosity between about 1000 and 50,000 centipoises at 25° C., and (2) between 40 and 20 parts of a benzene-soluble silicone resin composed essentially of $R_3SiO_{1/2}$ and $SiO_2$ units, where R is an organic radical and where the ratio of $R_3SiO_{1/2}$ units to $SiO_2$ units is between about 0.7 and 0.96. They also include, for every 100 parts total of gum and resin, between 0.1 and 2 parts by weight of (3) a vulcanization catalyst active to gel and cross-link at least the diorganopolysiloxane gum. (4) Organic silicates in an amount up to about 5 parts for every 100 parts of gum and resin may be included and desirably effect a further improvement of the strength and firmness of a cured structure formed from our composition. In particular, however, they accelerate the rate of cure of the composition at room temperature. Also, (5) up to about 20 parts of inorganic fillers for every 100 parts of gum and resin may be used to gain improvements in the resistance to high temperature aging exhibited by the cured structures hereof.

The low viscosity diorganopolysiloxane fluid gums (1) useful in forming our composition are essentially linear, essentially free of hydroxyl end-blocking, and have the general formula

where R is a monovalent organic radical and $n$ has an average value of about 1.9 to 2.1. At least 85% of the R groups in the fluid gum must be methyl; and the amount of methyl is preferably 90% or more. Illustrative optional monovalent organic radicals which may also be present in the fluid gum are alkyl radicals (e.g., ethyl and propyl), aralkyl radicals (e.g., benzyl), aryl radicals (e.g., phenyl, xenyl, and naphthyl), alkaryl radicals (e.g., tolyl and xylyl), cycloaliphatic radicals (e.g., cyclohexyl and cyclopentyl), alkenyl radicals (e.g., vinyl and allyl), halogenated monovalent hydrocarbon radicals (e.g., chloromethyl), and alkoxy radicals (e.g., methoxy and ethoxy), etc. Preferably the amount of aralkyl, aryl, alkaryl and cycloaliphatic radicals in the gum will not exceed 10% of the R groups; and the amount of alkenyl preferably is not in excess of 2% of the R groups. Groups other than those aforementioned may be present in small amount in these fluid gums without upsetting the required performance properties of our composition. Our fluid gums, however, are essentially free of hydroxyl termination or hydroxyl end-blocking. They are essentially free of hydroxyl groups as such and the occluded water frequently found in hydroxyl gums because of their method of preparation. Known hydroxyl end-blocked gums appear to exhibit relatively poor stability on heating after a period of time at elevated temperatures around 400–500° F.

Useful fluid gums for the compositions hereof may be prepared by such well-known methods as the alkali (e.g., potassium hydroxide) catalyzed polymerization of cyclic siloxanes (e.g., octamethyltetrasiloxane with or without methyl phenyl cyclic siloxanes, methyl vinyl cyclic siloxanes, etc.) in a dry atmosphere such as nitrogen at temperatures of from 50° C. to about 180° C. until the desired viscosity is reached. Polymerization may be stopped by destroying the remaining alkali hydroxide by introducing carbon dioxide, or by adding a small amount of finely divided silica to adsorb and inactivate remaining alkali hydroxide. Removal of unreacted constituents may be accomplished by distillation. Various other well-known methods of preparing liquid gums useful in practicing our invention may be employed; and the foregoing is merely offered as an illustration. As may be observed, no particular step in the method of preparation is devoted to obtaining accurately controlled and uniform end-blocking groups in the linear polysiloxane gum. Thus, they frequently may have varied end-blocking or termination groups, e.g., —OK, —CH$_3$, —OCH$_3$, —ONa, etc. While they are essentially free of hydroxyl end-blocking as aforenoted, these gums usually contain a significant but small number of monovalent radicals attached to silicon atoms through an oxygen atom (e.g., —OK, —OCH$_3$, —ONa, etc.).

In essential respects, silicone resin (2) is a copolymer of R$_3$SiO$_{1/2}$ and SiO$_2$ units, where R is preferably an alkyl radical of less than 4 carbon atoms or a phenyl radical, and where the ratio of R$_3$SiO$_{1/2}$ to SiO$_2$ units is between about 0.7 and 0.96 inclusive. At least 90% of the total number of R radicals in this resin are preferably alkyl, methyl being by far the most common alkyl in commercially available resins of this type. As in the case of our organopolysiloxane fluid gum, the R groups of our resin may also in small part be selected from a variety of other monovalent organic radicals (e.g., such R groups as those optionally present in the gum) without upsetting the desired characteristics of the resin in its performance in our product. A small content of R$_2$SiO units, where R is as above defined in connection with gum (1), may also be included in the structure of this resin.

The fluid gum and resin are maintained in a certain critical ratio relationship in our compositions. Based on 100 parts total for the fluid gum (1) and resin (2) mixture, the gum (1) content must account for about 60 to 80 parts and the resin (2) content between about 40 and 20 parts. In other words, the ratio of gum to resin in the composition varies from 1.5 to 4. Outside of such limits, loss of required properties takes place. For example, if more than about 40 parts of resin (2) are employed with 60 parts of gum (1), the mixture tends to increase in viscosity, loses its easy workability; and difficulty in uniformly blending the catalyst in the mixture is encountered. Also, the resulting composition give structural products having a tendency toward surface tackiness, poor elasticity, a tendency toward brittleness, and frequently a poor resistance to high temperature aging. Less than 20 parts of resin in a mixture containing 80 parts of gum gives compositions which exhibit poor adhesion to substrates; and the resulting cured structure exhibits poor strength. A particularly surprising part of our discovery, therefore, is that silicone resins of the type here employed may be used in a balanced composition as here taught to impart to the end cured product a toughness and strength heretofore associated only with cured products of high molecular weight silicone gum with a fume silica reinforcing filler. That the resin in our compositions could serve as a reinforcing agent was a totally unexpected and surprising discovery.

The optimum (or the preferred) combination of properties is exhibited by systems containing, for every 100 parts of gum and resin mixture, between 62 and 70 parts of gum and between 30 and 38 parts of resin. These compositions are liquid and easily poured into place for curing. The solid resin component does not upset the desired low viscosity of the compositions. They cure to give structures which are tough, elastic and resilient within a useful temperature range of at least 600° F. (between about minus 100° F. to plus 500° F.). As final cured structural products, they even can be bounced, without shattering, on a concrete floor immediately after being withdrawn from a bath of liquid nitrogen. They have desirable electrical insulation properties and exhibit high resistance to degradative attack by water, various chemicals such as most dilute acids, bases, etc., and many solvents, e.g., acetone, methyl ethyl ketone, alcohols, etc.

The vulcanization catalyst (3) used to effect gelling and cross-linking of the composition may be selected from any of a variety of known catalysts effective to cure at least the organopolysiloxane component of the composition. Particularly preferred vulcanization catalysts are those known as the basic metal salts of carboxylic acids, e.g., lead octoate, tin octoate, dibutyl tin dilaurate, tin, lead, zinc or cobalt naphthanates, etc. Amongst these heavy metal salts of carboxylic acids (and the foregoing listing should only be construed as illustrative), the preferred materials to employ are lead octoate, tin octoate and dibutyl tin dilaurate. Fluid compositions of the invention cured using such catalysts can withstand lengthy exposure to high temperatures (e.g., 400° F.) without discoloration or degradation. Advantageously, the preferred metal salts of carboxylic acids such as lead octoate, tin octoate and dibutyl tin dilaurate serve to effect curing of our composition within a practical length of time even under room temperature conditions. In the presence of an organic silicate, essentially all of these basic metal salts of carboxylic acids are effective catalysts for curing under room temperature conditions. There is some evidence to indicate that the basic metal salts of carboxylic acids effect a cross-linking between the silicone resin component of our composition and the gum component thereof. This seems to be borne out by the fact that only a minor percentage of the silicone resin can be extracted from the cured article even when the best solvent for the resin is employed and soaking is conducted for extended period (e.g., more than 24 hours). Such a result is particularly advantageous and resulting products have especially pronounced properties of the type aforenoted.

Condensation products of an aliphatic aldehyde and an aliphatic primary amine such as described in United States Patent No. 2,833,742, may also be employed as the curing catalyst; and the disclosure of such products in United States Patent No. 2,833,742 is here incorporated by reference. These products generally are formed using aldehydes and amines containing less than 8 carbon atoms.

Where room-temperature curing of the liquid composition is not required, it is possible to employ, as the catalytic component, such known materials as the organic peroxides, e.g., benzoyl peroxide, ditertiary butyl peroxide, tertiary butyl perbenzoate, dioumyl peroxide, 2,4-dichloro benzoyl peroxide, etc. Where peroxides are used alone as the curing agent, heating of the composition, e.g. about 300–400° F. usually is needed to effect cure. If desired, mixtures of a variety of catalysts such as herein noted may be employed.

The addition of organic silicates to our basic formulation offers some advantages with respect to the ultimate strength (toughness and firmness) exhibited by cured structures formed from the composition. In addition, organic silicates serve as accelerators for room-temperature curing when metal salts of carboxylic acids are employed as the curing agent. Suitable organic silicates for this purpose are monomeric and polymeric silicates in which the organic radicals, whether substituted or unsubstituted, saturated or unsaturated, contain preferably no more than about six carbon atoms. Some illustrative silicates are tetraethyl orthosilicate, monomeric methyl triethoxy silane, partially condensed tetraethoxy orthosilicate, isopropyl polysilicate, methyl polysilicate, ethyl polysilicate, propyl polysilicate, butyl polysilicate, amyl polysilicate, etc. These organic silicates may be devolatilized prior to use, e.g., by heating them up to about 500° F., and should be either liquid or soluble in benzene. A preferred readily available organic silicate to employ is partially condensed tetraethoxy orthosilicate.

Fillers such as fume silica, titanium dioxide, zinc oxide, calcium carbonate, carbon black, iron oxide, barium zirconate, zirconium silicate, ground quartz, etc., may be added to the composition in an amount up to about 20 parts by weight for every 100 parts of the gum resin mixture. They frequently tend to improve the strength and high temperature aging resistance of cured structures formed using the composition, but should not be used in excess where they create interference with fluidity of the composition.

In addition, colorants, pigments, modifiers (such as a small amount, e.g., up to about 20 parts based on the weight of the gum-resin mix, of silicone gums having a viscosity greater than 50,000 cps.), etc., may all be added to our composition so long as its essential characteristics are not upset.

The following examples are offered to illustrate our invention but are not to be construed as limitative of the scope thereof.

*Example 1*

In 62.5 parts of a diorganopolysiloxane gum having a viscosity of about 12,000 cps. at 25° C. was mixed and dissolved 37.5 parts of a solid silicone resin with the aid of about 19 parts toluene to aid in achieving solution. The toluene was evaporated at 150° F. for 4 hours at 20 mm. Hg. pressure leaving a clear fluid of about 25,000 cps. viscosity at 25° C.

The gum employed was a dimethyl polysiloxane essentially free of hydroxyl end-blocking, but having end-blocking groups of —OK, and having about 7.5% methyl phenyl groups. The silicone resin was prepared from sodium silicate neutralized with hydrochloric acid and reacted with hexamethyl disiloxane and trimethyl chlorosilane. The silicone resin product, after washing and drying, was a tack-free, colorless solid having a ratio of $(CH_3)_3SiO_{1/2}$ to $SiO_2$ units of about 0.8.

*Example 2*

One part of lead octoate was added to the gum-resin mixture of Example 1, and stirred thoroughly into the mixture. After adding the lead octoate, the blend remained pourable and fluid for about 4 hours, during which time it could be poured into difficultly accessible locations to gain penetration into hidden crevices and the like. It therefore had a pot life of about 4 hours. About 5 hours after adding the catalyst, the mixture converted at room temperature into a soft, very tacky gel adhering to the surface of the cylindrical aluminum mold in which it had been poured. After 5 days at room temperature, it was converted to a firm, resilient, tough, non-crumbling, tack-free silicone structure. An equivalent cure of the liquid composition was gained by heating it for 24 hours at 150–200° F. The resulting product was firmly adhered or bonded to the walls of the container.

*Example 3*

To 100 parts of the gum-resin mixture of Example 1 was added 1 part by weight of partially condensed, liquid tetraethoxy orthosilicate ("Ethyl silicate 40"), and 0.5 part of lead octoate. The ingredients were stirred together and remained in a workable fluid condition for about 3 hours after mixing in the lead catalyst. During this time, the mixture was poured into a cylindrical aluminum mold; and after about 5 hours at room temperature, it had converted to a soft, very tacky gel. After 48 hours at room temperature, it was a firm, rubbery, tough, clear, tack-free, void-free solid firmly bonded to the walls of the container.

In a separate test, this mixture was placed in a mold having low adhesion surfaces coated with a layer of polytetrafluoroethylene. Stripped from this mold after curing, the resulting tough structural molded article was placed in liquid nitrogen for 15 minutes, and then withdrawn and immediately thrown upon a concrete floor. It bounced from the floor without cracking or shattering. Such demonstrates the unusual resiliency of our cured articles under extreme cold, and points to their suitability for use in aircraft and missile construction where vibrations and other forces causing shattering, cracking and the like of nonresilient or brittle silicone articles has been a heretofore unsolved problem.

*Example 4*

Substitution of 0.5 part tin octoate for the lead octoate of Example 3 produced a mixture that gelled in about 2 minutes and was essentially fully cured in about 24 hours.

*Example 5*

Addition of about 10 parts of silica to the formulation of Example 3 produced a slightly tougher and firmer cured end product.

In marketing our compositions, it is convenient to package them in two-part flexible packages preferably formed of transparent heat-sealable films such as polyethylene coated polyethylene terephthalate. In one compartment or part of such package, essentially all components other than the catalyst and an optional small amount of the diorganopolysiloxane fluid gum is sealed; and in the other compartment, temporarily separated from the first compartment by a rupturable barrier seal (e.g., a heat-seal), the catalyst wtih or without a small portion of fluid gum may be sealed. Such an article can easily be handled in commerce. At the point of use, consumers can readily rupture or break the barrier seal between the compartments by squeezing the contents of one of the compartments, thereby joining the compartments of the package together. After breaking the temporary barrier, the consumer kneads the ingredients of the compartments together, while they are within the package, and then cuts a hole in the package for pouring the ingredients into position where a shock-absorbing, flexible, resilient, tough, well-bonded, insulating structure is desired. All this can be accomplished without expensive molding apparatus and, in the case of the preferred room temperature curing embodiment hereof, without the need for applying external heat.

That which is claimed is:

1. A fluid, low-viscosity solvent-free siloxane composition adapted to cure to a flexible, tough, resilient, tack-free, structural product, said composition exhibiting high tack and adhesive properties as it is cured, and comprising a mixture of (1) between 60 and 80 parts of a diorganopolysiloxane fluid gum essentially free of hydroxyl termination, having a viscosity of between 1000 and 50,000 cps. at 25° C., and having the general formula $$R_nSiO_{\frac{4-n}{2}}$$

where R is a monovalent organic radical, at least 85% of said radicals being methyl, and n has an average value of 1.9 to 2.1, and (2) between 40 and 20 parts of a benzene-soluble silicone resin, said resin being dissolved in said fluid gum and being composed essentially of $R_3SiO_{1/2}$ units and $SiO_2$ units, where R is a monovalent organic radical, at least 90% of said radicals being methyl, and where the ratio of $R_3SiO_{1/2}$ units to $SiO_2$ units in said resin is between about 0.7 and 0.96 inclusive, said composition additionally including, for every 100 parts of said mixture, (3) between 0.1 and 2 parts by weight of a vulcanization catalyst effective to cross-link and cure the diorganopolysiloxane gum and silicone resin mixture.

2. The composition of claim 1 containing, in addition, an organic silicate in an amount not in excess of about 5 parts by weight based on 100 parts of said gum (1) and resin (2) mixture.

3. A siloxane structural product comprising the room-temperature reaction product of the composition defined in claim 1.

4. As a new article of manufacture: a flexible package having at least two filled compartments with a rupturable barrier between said compartments serving to separate the contents of said compartments from each other during storage and shipment, said barrier being easily ruptured so as to permit kneading and mixing of the contents of said compartments at time of use, the compartments of said package being filled with ingredients which on mixing satisfy the compositional requirements of claim 1, the said vulcanization catalyst required in claim 1 being in one of said compartments separated from essentially all of the remaining ingredients of said composition by said rupturable barrier.

5. A fluid, low-viscosity solvent-free siloxane composition adapted to cure to a flexible, tough, resilient, tack-free structural product, said composition exhibiting high tack and adhesive properties as it is cured, and comprising a mixture of (1) between 60 and 80 parts of a diorganopolysiloxane fluid gum essentially free of hydroxyl termination, having a viscosity of between 1000 and 50,000 cps. at 25° C., and having the general formula $$R_nSiO_{\frac{4-n}{2}}$$

where R is a monovalent organic radical selected from the group consisting of alkyl radicals, aralkyl radicals, aryl radicals, alkaryl radicals, cycloaliphatic radicals, alkenyl radicals, halogenated monovalent hydrocarbon radicals, alkoxy radicals, and mixtures thereof, at least 85% of said radicals being methyl, and where $n$ has an average value of 1.9 to 2.1, (2) between 40 and 20 parts of a benzene-soluble silicone resin, said resin being dissolved in said fluid gum and being composed essentially of $R_3SiO_{1/2}$ and $SiO_2$ units, where R is a monovalent organic radical selected from the group of monovalent organic radicals enumerated for the aforesaid fluid gum, with at least 90% of the monovalent organic radicals in said resin being methyl, and where the ratio of $R_3SiO_{1/2}$ to $SiO_2$ in said resin is between about 0.7 and 0.96 inclusive, and (3) between 0.1 and 2 parts, based on every 100 parts of said gum and resin mixture, of a vulcanization catalyst effective to catalytically cross link and cure the diorganopolysiloxane fluid gum and silicone resin mixture.

6. A fluid, low-viscosity solvent-free siloxane composition adapted to cure to a flexible, tough, resilient, tack-free, structural product, said composition exhibiting high tack and adhesive properties as it is cured, and comprising a mixture of (1) between 62 and 70 parts of a diorganopolysiloxane fluid gum essentially free of hydroxyl termination, having a viscosity of between 1000 and 50,000 cps. at 25° C. and having the general formula $$R_nSiO_{\frac{4-n}{2}}$$

where R is a monovalent organic radical, at least 85% of said radicals being methyl, and $n$ has an average value of 1.9 to 2.1, and (2) between 30 and 38 parts of a benzene-soluble silicone resin, said resin being dissolved in said fluid gum and being composed essentially of $R_3SiO_{1/2}$ units and $SiO_2$ units, where R is a monovalent organic radical, at least 90% of said radicals being methyl, and where the ratio of $R_3SiO_{1/2}$ units and $SiO_2$ units in said resin is between about 0.7 and 0.96 inclusive, said composition additionally including, for every 100 parts of said mixture, (3) between 0.1 and 2 parts by weight of a vulcanization catalyst effective to cross-link and cure the diorganopolysiloxane fluid gum and silicone resin mixture.

7. The composition of claim 6 containing, in addition, an organic silicate in an amount not in excess of about 5 parts by weight based on 100 parts of said gum and resin mixture.

8. A siloxane structural product comprising the room-temperature-reaction product of the composition defined in claim 6.

9. As a new article of manufacture, a flexible package having at least two filled compartments with a rupturable barrier between said compartments serving to separate the contents thereof from each other during shipment and storage, said barrer being easily ruptured so as to permit mixing of the contents of said compartments at time of use, the compartments of the package being filled with ingredients which on mixing satisfy the compositional requirements of claim 6, the said vulcanization catalyst required in claim 6 being in one of said compartments separated from essentially all of the remaining ingredients of said composition by said rupturable barrier.

References Cited in the file of this patent

UNITED STATES PATENTS

| | | |
|---|---|---|
| 2,442,196 | Coggeshall | May 25, 1948 |
| 2,672,455 | Currie | Mar. 16, 1954 |
| 2,736,721 | Dexter | Feb. 28, 1956 |
| 2,756,875 | Yochim | July 31, 1956 |
| 2,814,601 | Currie et al. | Nov. 26, 1957 |
| 2,843,555 | Berridge | July 15, 1958 |
| 2,857,356 | Goodwin | Oct. 21, 1958 |
| 2,860,083 | Nitzsche et al. | Nov. 11, 1958 |
| 2,864,492 | Lappala | Dec. 16, 1958 |